(12) United States Patent
Fukaya

(10) Patent No.: US 9,335,694 B2
(45) Date of Patent: May 10, 2016

(54) IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Hideaki Fukaya, Suntou Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/598,916

(22) Filed: Jan. 16, 2015

(65) Prior Publication Data
US 2015/0253709 A1    Sep. 10, 2015

(30) Foreign Application Priority Data

Mar. 5, 2014    (JP) ................................. 2014-042530

(51) Int. Cl.
*G03G 15/00*    (2006.01)
*G03G 21/20*    (2006.01)
*G06F 3/12*    (2006.01)

(52) U.S. Cl.
CPC ............... *G03G 15/50* (2013.01); *G03G 21/20* (2013.01); *G06F 3/126* (2013.01); *G03G 2215/00772* (2013.01)

(58) Field of Classification Search
CPC    G03G 15/50; G03G 15/5079; G03G 15/5075
USPC ............................................ 399/82
See application file for complete search history.

(56) References Cited

U.S. PATENT DOCUMENTS

| 2007/0071465 A1* | 3/2007 | Hamby et al. .................. 399/45 |
| 2008/0124143 A1* | 5/2008 | Shinkawa .......... G03G 15/2028 399/327 |
| 2010/0272449 A1* | 10/2010 | Yoshida et al. .................... 399/2 |
| 2011/0236048 A1* | 9/2011 | Mukai ................ G03G 15/2039 399/70 |

FOREIGN PATENT DOCUMENTS

JP    2005-085022    3/2005

* cited by examiner

*Primary Examiner* — Walter L Lindsay, Jr.
*Assistant Examiner* — Jessica L Eley
(74) *Attorney, Agent, or Firm* — Patterson & Sheridan, LLP

(57) ABSTRACT

According to an embodiment, an image forming apparatus includes a job queue that registers jobs and a controller that executes the jobs according to an order in which the jobs are registered in the job queue. Further, when a plurality of jobs that differ in a control temperature of a heat source are registered in the job queue, the controller sorts the jobs in the job queue so that a required time until execution of all the jobs is completed becomes shortest.

8 Claims, 8 Drawing Sheets

| JOB TYPE<br>(PHYSICAL PROPERTY OF A TONER) | CONTROL TEMPERATURE RANGE<br>OF A HEAT SOURCE [°C] |
|---|---|
| DECOLORABLE IMAGE FORMING JOB<br>(FIXING TEMPERATURE OF DECOLORABLE TONER) | 150~160 |
| NON-DECOLORABLE IMAGE FORMING JOB<br>(FIXING TEMPERATURE OF NON-DECOLORABLE TONER) | 170~190 |
| DECOLORING JOB<br>(DECOLORING TEMPERATURE OF DECOLORABLE TONER) | 200~220 |

Fig.3 ically illustrating a configuration of the image forming apparatus 100. The image forming apparatus 100 can execute a non-decolorable image forming job of forming an image using a non-decolorable color material such as a non-decolorable toner or a non-decolorable ink which is non-decolorable. The image forming apparatus 100 can execute a decolorable image forming job of forming an image using a decolorable color material such as a decolorable toner or decolorable ink that is decolorable. Further, the image forming apparatus 100 can execute a decoloring job of decoloring an image that is formed on a sheet using a decolorable color material.
IMAGE FORMING APPARATUS

CROSS-REFERENCE TO RELATED APPLICATION

This application is based upon and claims the benefit of priority from the prior Japanese Patent Application No. 2014-042530, filed on Mar. 5, 2014, the entire contents of which is incorporated herein by reference.

FIELD

The embodiment discussed herein is generally directed to an image forming apparatus having a management function of jobs.

BACKGROUND

In the past, there is an image forming apparatus capable of performing an image forming job by a decolorable toner, a non-decolorable image forming job by a non-decolorable toner, and an image decoloring job by a decolorable toner. The image forming job by the decolorable toner is a job of forming an image using a decolorable toner and thermally fixing the image onto a recording medium such as a sheet. The non-decolorable image forming job by the non-decolorable toner is a job of forming an image using a non-decolorable toner and thermally fixing the image onto a recording medium such as a sheet. The image decoloring job by the decolorable toner is a job of thermally decoloring an image fixed onto a recording medium such as a sheet using the decolorable toner. The image forming apparatus performs the image forming job by the decolorable toner, the non-decolorable image forming job by the non-decolorable toner, and the image decoloring job by the decolorable toner using the same heat source.

However, in the image forming apparatus, the respective jobs are performed at different control temperatures of the heat source. Thus, in the image forming apparatus, when a plurality of jobs to be executed are received, it is necessary to frequently change the temperature of the heat source when the respective jobs are executed. Thus, there is a problem in that a time to complete the jobs by the image forming apparatus gets longer.

BRIEF DESCRIPTION OF THE DRAWINGS

FIG. 3 is a diagram illustrating a control temperature range of a heat source according to a job type when an image forming apparatus according to an embodiment executes a job;

DETAILED DESCRIPTION

According to an embodiment, an image forming apparatus includes an image forming unit, a heat source, a job queue, and a controller. The image forming unit forms an image on a sheet. The heat source heats the sheet at a control temperature according to a job type. The job queue registers jobs in a received order. The controller groups the jobs registered in the job queue into job groups that differ in the control temperature when a plurality of jobs that differ in the control temperature are registered in the job queue. Further, the controller changes an order of the job groups in the job queue so that a required time until execution of all the job groups is completed becomes shortest. Furthermore, the controller executes the jobs registered in the job queue according to the changed order.

Figure 1:
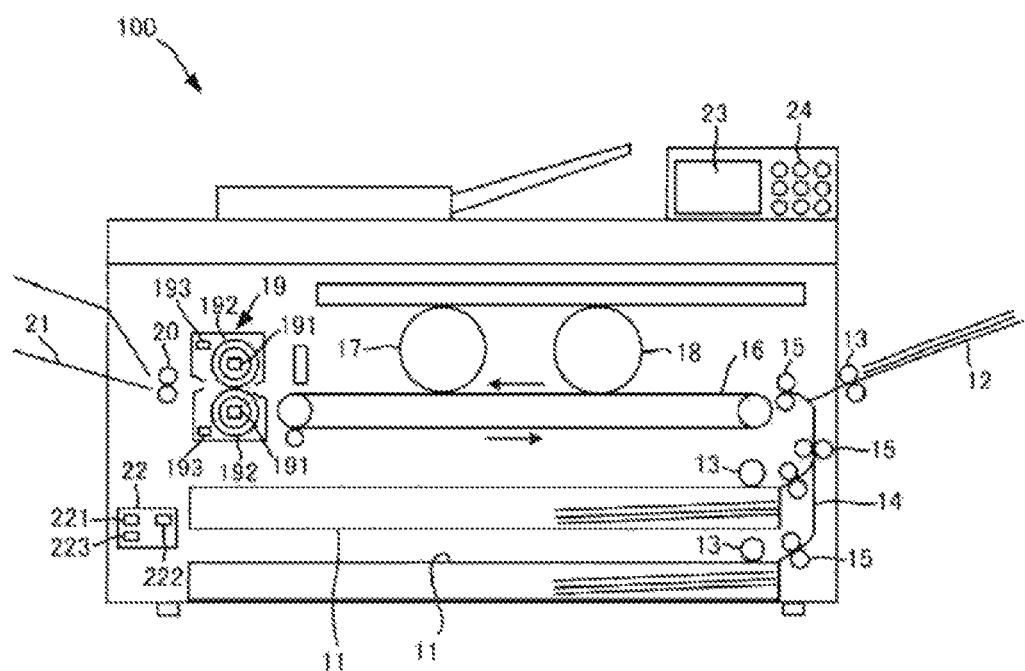
FIG. 1 is a diagram illustrating a configuration of an image forming apparatus according to an embodiment.

Hereinafter, a preferred embodiment will be described with reference to the appended drawings. In the drawings, the same reference numerals denote the same or similar parts. An image forming apparatus 100 according to an embodiment is described with reference to FIG. 1. FIG. 1 is a diagram schematically illustrating a configuration of the image forming apparatus 100. The image forming apparatus 100 can execute a non-decolorable image forming job of forming an image using a non-decolorable color material such as a non-decolorable toner or a non-decolorable ink which is non-decolorable. The image forming apparatus 100 can execute a decolorable image forming job of forming an image using a decolorable color material such as a decolorable toner or decolorable ink that is decolorable. Further, the image forming apparatus 100 can execute a decoloring job of decoloring an image that is formed on a sheet using a decolorable color material.

The decolorable color material includes a coloring agent, a developer, and a decoloring agent. As the coloring agent, for example, leuco dyes that produce a blue color are used. As the developer, for example, phenols are used. As the decoloring agent, materials that are compatiblized with the coloring agent when heated and thus do not have an affinity with the developer are used. The decolorable color material produces a color by an interaction between the coloring agent and the developer, and when the decolorable color material is heated at a temperature equal to or higher than a decoloring temperature, the interaction between the coloring agent and the developer is broken, and thus the decolorable color material is decolored.

In the following description, the image forming apparatus 100 forms an image using a decolorable toner and a non-decolorable toner as the color material. Further, the image forming apparatus 100 decolors an image using a decolorable toner.

The image forming apparatus 100 includes a paper cassette 11, a paper tray 12, a paper feed unit 13, a conveying path 14, a carriage roller 15, a carriage belt 16, a first image forming unit 17, a second image forming unit 18, a heat source 19, an ejecting unit 20, a discharge tray 21, a controller 22, a display 23, and an operation panel 24 as illustrated in FIG. 1.

The paper cassette 11 accommodates sheets used for the non-decolorable image forming job and the decolorable image forming job in a stacked state. Sheets used to perform the decoloring job are stacked on the paper tray 12. In order to reuse sheets, a user uses the decoloring job of the image forming apparatus 100. Thus, a sheet on which the decoloring job is performed is a sheet of a reuse processing target. The paper feed unit 13 takes a sheet from the paper cassette 11 when the image forming apparatus 100 executes the decolorable image forming job by the decolorable toner, and the non-decolorable image forming job by the non-decolorable toner. The paper feed unit 13 feeds the sheet taken from the paper cassette 11 to the conveying path 14. Further, when the image forming apparatus 100 executes the decoloring job, the paper feed unit 13 takes a sheet from the paper tray 12. The paper feed unit 13 feeds the sheet taken from the paper tray 12 to the conveying path 14.

The conveying path 14 is a path formed from the paper cassette 11 and the paper tray 12 to the discharge tray 21. The conveying path 14 guides the sheet fed by the paper feed unit 13 toward the discharge tray 21. The carriage roller 15 is installed at an appropriate position in the conveying path 14 as illustrated in FIG. 1. The carriage roller 15 conveys the sheet guided by the conveying path 14 toward the carriage belt 16 at the downstream side. The carriage belt 16 is installed in the conveying path 14 at the downstream side of the carriage roller 15 and the upstream side of the heat source 19. The carriage belt 16 conveys the sheet up to the heat source 19 through the first image forming unit 17 and the second image forming unit 18 while causing the sheet to be electrostatically absorbed on its surface.

The first image forming unit 17 and the second image forming unit 18 are disposed to face the carriage belt 16. The first image forming unit 17 is disposed at the downstream side of the second image forming unit 18 in a conveyance direction of a sheet. When the image forming apparatus 100 executes the decolorable image forming job, the first image forming unit 17 forms an image on the sheet conveyed by the carriage belt 16 using the decolorable toner. For example, the first image forming unit 17 forms an image using only a decolorable toner of a solid blue. As another embodiment, the first image forming unit 17 may form an image using decolorable toners of a plurality of colors.

When the image forming apparatus 100 executes the non-decolorable image forming job, the second image forming unit 18 forms an image on the sheet conveyed by the carriage belt 16 using the non-decolorable toner. For example, the second image forming unit 18 forms an image using only a non-decolorable toner of a solid black. As another embodiment, the second image forming unit 18 may form an image using non-decolorable toners of a plurality of colors. For example, the image forming unit 17 or 18 forms an electrostatic latent image on a photosensitive element through a laser optical system. The image forming unit 17 or 18 develops the electrostatic latent image through a developing unit including the decolorable toner and the non-decolorable toner. The image forming unit 17 or 18 develops the electrostatic latent image, and form a toner image by the decolorable toner or the non-decolorable toner. The image forming unit 17 or 18 transfers the formed toner image from the photosensitive element onto the sheet.

The heat source 19 includes a heater 191, a heating roller 192, and a temperature sensor 193. The heater 191 is disposed inside or around the heating roller 192. The heater 191 heats the heating roller 192. The controller 22 adjusts an output of the heater 191 so that the temperature of the heating roller 192 is within a target control temperature range (a control temperature). Specifically, the controller 22 adjusts the output of the heater 191 in order to increase or decrease the temperature of the heating roller 192 to be within the target control temperature range. Further, the controller 22 adjusts the output of the heater 191 so that the temperature of the heating roller 192 is maintained within the target control temperature range. The control temperature range will be described later (see FIG. 3).

The heating roller 192 includes a pair of rollers arranged to face each other. The heating roller 192 pinches the sheet and comes into contact with respective surfaces (the front surface and the back surface) of the sheet. When the image forming apparatus 100 executes the decolorable image forming job or the non-decolorable image forming job, the heating roller 192 heats the sheet on which the images are formed by the image forming unit 17 or 18 at a certain fixing temperature, and fixes the image (the toner image by the decolorable toner or the non-decolorable toner) onto the sheet. Further, when the image forming apparatus 100 executes the decoloring job, the heating roller 192 heats the sheet on which the image by the decolorable toner is formed at a certain decoloring temperature, and decolors the image (the toner image by the decolorable toner). In other words, the heating roller 192 performs both a function of fixing the toner image formed on the sheet to the sheet and a function of decoloring the toner image formed on the sheet. The fixing temperature and the decoloring temperature will be described later. The temperature sensor 193 is disposed around the heating roller 192. The temperature sensor 193 detects the temperature of the heating roller 192. The controller 22 adjusts the output of the heater 191 based on a detection result of the temperature sensor 193. The ejecting unit 20 ejects the sheet having passed through the heat source 19 to the discharge tray 21.

The controller 22 includes a processor 221, a memory 222, and a hard disk drive (HDD) 223. The controller 22 generally controls the image forming apparatus 100. The processor 221 executes a program stored in the memory 222 or the HDD 223, and implements various kinds of functions of the image forming apparatus 100.

The display 23 includes a touch panel or the like. The display 23 displays a screen related to an operation of the image forming apparatus 100. Specifically, for example, the display 23 displays a screen indicating a state of a job queue (see FIG. 2 and FIGS. 5 to 7) which will be described later. The display 23 also serves as an operation panel that receives an input of the user. The operation panel 24 includes a button or a key. The operation panel 24 receives the input of the user. Specifically, for example, the operation panel 24 receives the input of the user indicating execution of the decolorable image forming job, the non-decolorable image forming job, or the decoloring job.

Figure 2:
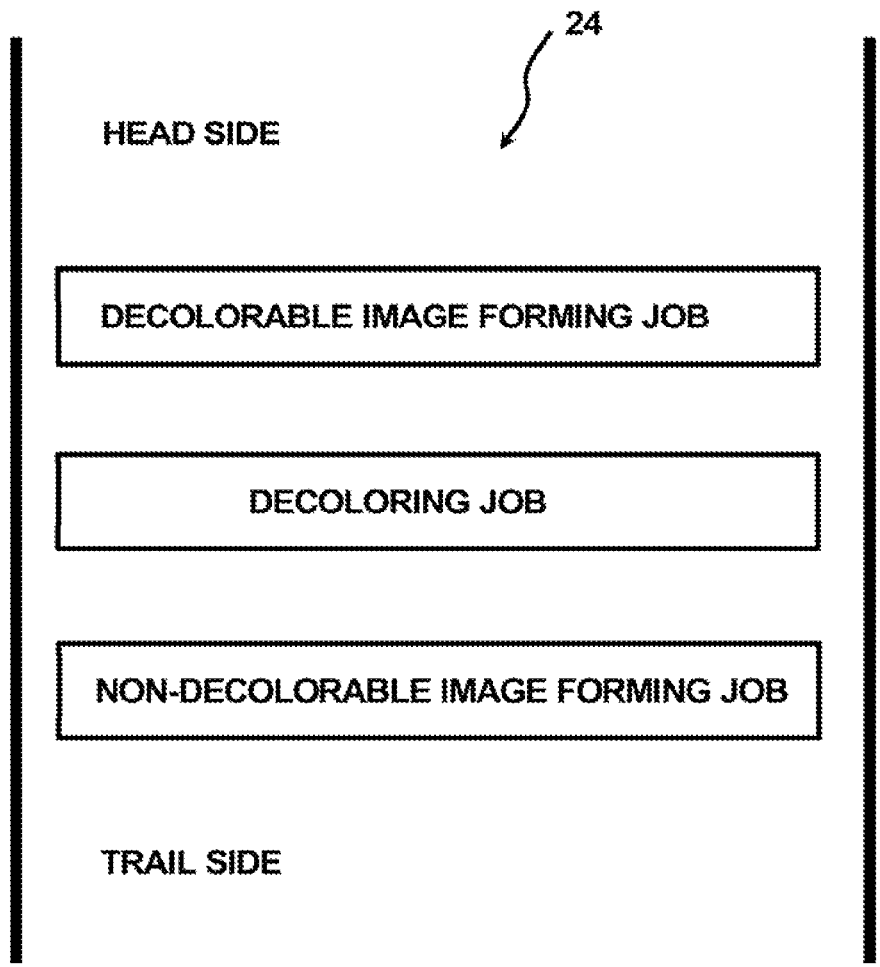
FIG. 2 is a diagram illustrating a job queue 24 of an image forming apparatus according to an embodiment.

The HDD 223 includes a job queue 24 serving as a storage region in which the decolorable image forming job, the decoloring job, and the non-decolorable image forming job received by the operation panel 24 are registered. The job queue 24 is described with reference to FIG. 2. FIG. 2 is a diagram illustrating the job queue 24 in the HDD 223. The controller 22 registers the received jobs in the job queue 24 in an order in which a job execution instruction input is received by the operation panel 24. For example, when the operation panel 24 receives the job execution instruction inputs in the order of the decolorable image forming job, the decoloring job, and the non-decolorable image forming job, the controller 22 registers the decolorable image forming job to the head side in the job queue 24, registers the decoloring job to a next position, and registers the non-decolorable image forming job to the tail side as illustrated in FIG. 2.

For example, when the operation panel 24 receives the job execution instruction inputs in the order of the decolorable image forming job, the decoloring job, and the non-decolorable image forming job, the job queue 24 registers the decolorable image forming job to the head side, registers the decoloring job to a next position, and registers the non-decolorable image forming job to the tail side as illustrated in FIG. 2. The controller 22 performs sorting (which will be described later) on the received jobs so that the received jobs are processed in a shortest time. After the job sorting, the controller 22 executes the jobs from the head side in the job queue 24. Further, the controller 22 deletes the executed job from the job queue 24.

Next, the control temperature range of the heat source 19 when the image forming apparatus 100 executes the decolorable image forming job, the decoloring job, and the non-decolorable image forming job will be described with reference to FIG. 3. FIG. 3 is a diagram illustrating the control temperature range of the heat source 19 according to a job type (a physical property of a toner) when each job is executed. The control temperature range when the decolorable image forming job is executed is the fixing temperature of the decolorable toner for fixing the image by the decolorable toner to the sheet. The control temperature range (the fixing temperature of the decolorable toner) when the decolorable image forming job is executed is 150° C. to 160° C. The control temperature range when the non-decolorable image forming job is executed is the fixing temperature of the non-decolorable toner for fixing the image by the non-decolorable toner to the sheet. The control temperature range (the fixing temperature of the non-decolorable toner) when the non-decolorable image forming job is executed is 170° C. to 190° C. The control temperature range when the decoloring job is executed is the decoloring temperature of the decolorable toner for decoloring the image by the decolorable toner formed on the sheet. The control temperature range (the decoloring temperature of the decolorable toner) when the decoloring job is executed is 200° C. to 220° C. For example, the memory 222 stores data of the control temperature range of the heat source 19 according to a job type illustrated in FIG. 3. The controller 22 adjusts the output of the heater 191 of the heat source 19 according to the data of the control temperature range of the memory 222 based on the temperature detection result of the temperature sensor 193. The controller 22 adjusts the temperature of the heating roller 192 of the heat source 19 to the temperature in the control temperature range according to the job by adjusting the output of the heater 191. Specifically, when the decolorable image forming job by the decolorable toner is executed, the controller 22 adjusts the control temperature range of the heat source 19 (the heating roller 192) to 150° C. to 160° C. When the non-decolorable image forming job by the non-decolorable toner is executed, the controller 22 adjusts the control temperature range of the heat source 19 to 170° C. to 190° C. When the image decoloring job by the decolorable toner is executed, the controller 22 adjusts the control temperature range of the heat source 19 to 200° C. to 220° C.

For example, when the operation panel 24 receives the execution instruction inputs for the respective job performed by the user in the order of the decolorable image forming job, the decoloring job, and the non-decolorable image forming job, an image forming apparatus according to a related art executes the jobs in the order in which the execution instruction inputs are received. Specifically, the image forming apparatus according to the related art adjusts the temperature of the heat source 19 to the control temperature range (150° C. to 160° C.) according to the decolorable image forming job in order to initially execute the decolorable image forming job. After the decolorable image forming job is executed, the image forming apparatus according to the related art adjusts the temperature of the heat source 19 to the control temperature range (200° C. to 220° C.) according to the decoloring job in order to execute the decoloring job. In other words, the image forming apparatus according to the related art has to increase the temperature of the heat source 19 by at least 40° C. Further, after the decoloring job is executed, the image forming apparatus according to the related art adjusts the temperature of the heat source 19 to the control temperature range (170° C. to 190° C.) according to the non-decolorable image forming job in order to execute the non-decolorable image forming job. In other words, the image forming apparatus according to the related art has to decrease the temperature of the heat source 19 by at least 30° C. As described above, the image forming apparatus according to the related art executes the jobs in the order in which the jobs are received and thus has to frequently change (increase or decrease) the temperature of the heat source 19 according to the job reception order. Thus, in the case of the image forming apparatus according to the related art, a time required until all the jobs are completed gets longer. When various kinds of jobs are received, the image forming apparatus according to an embodiment sorts the jobs in the job queue 24 so that the temperature of the heat source 19 is increased or decreased as rarely as possible, that is, a time required to complete all jobs gets shorter, and executes the jobs in an appropriate order.

Figure 4:
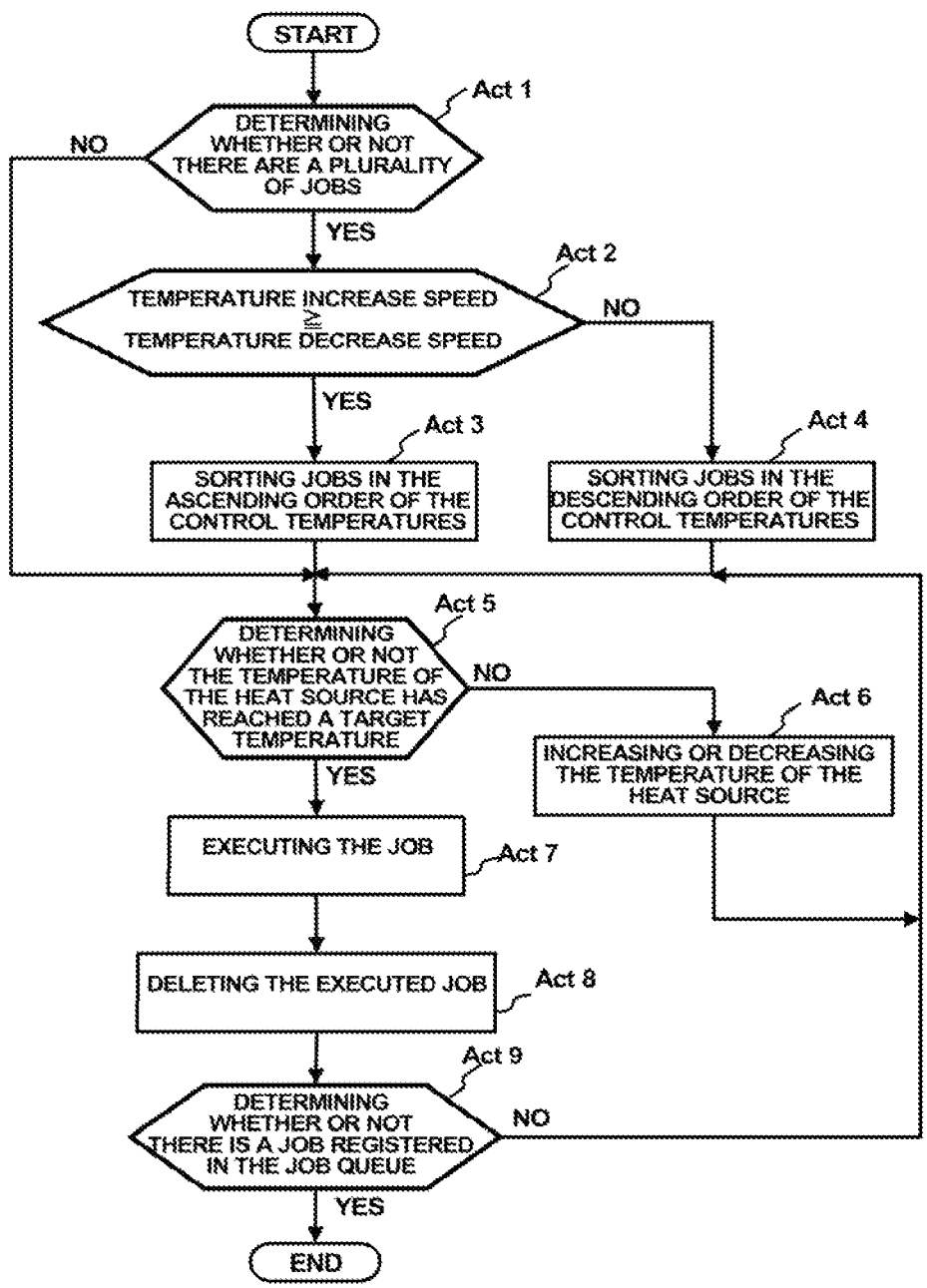
FIG. 4 is a flowchart illustrating a job execution process of an image forming apparatus according to an embodiment.

A process of sorting the jobs in the job queue 24 will be described with reference to FIGS. 4 to 6. FIG. 4 is a flowchart illustrating a job execution process performed by the controller 22. As illustrated in FIG. 4, in Act1, the controller 22 determines whether or not there are a plurality of jobs that differ in the control temperature range of the heat source 19 in the job queue 24.

Figure 5:
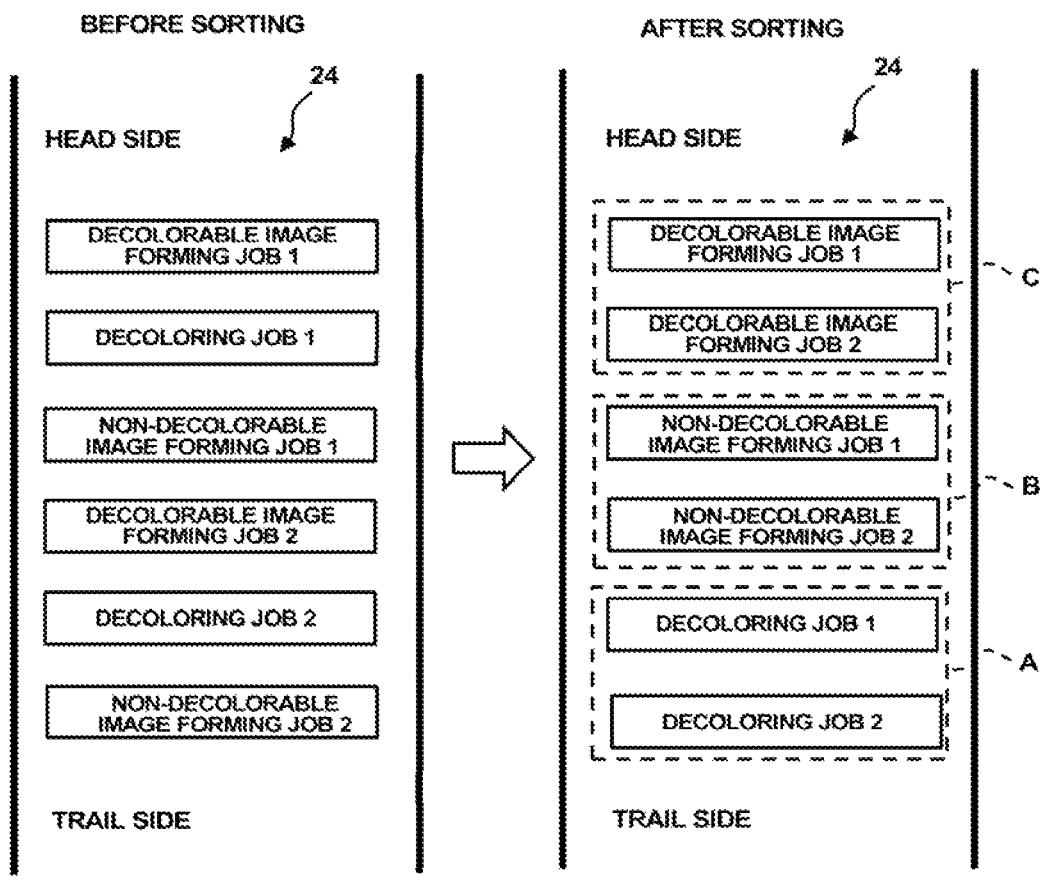
FIG. 5 is a diagram illustrating job sorting in a job queue when an image forming apparatus according to an embodiment increases a temperature of a heat source.

FIG. 5 is a diagram illustrating job sorting (hereinafter, referred to as "first job sorting") in the job queue 24 when the image forming apparatus 100 increases the temperature of the heat source 19 in order to execute the job. In a pre-job sorting state, various kinds of jobs are registered in the job queue 24 in the order in which the operation panel 24 receives the jobs. Specifically, as illustrated in FIG. 5 (before sorting), in the pre-job sorting state, the job queue 24 registers a decolorable image forming job 1, a decoloring job 1, a non-decolorable image forming job 1, a decolorable image forming job 2, a decoloring job 2, and a non-decolorable image forming job 2 in order from the head side. Through the first job sorting which will be described below, a registration state of the jobs in the job queue 24 is changed from the pre-job sorting state to the post-job sorting state as illustrated in FIG. 5.

When the controller 22 determines that there are registered a plurality of jobs that differ in the control temperature range in the job queue 24 in Act1 (YES in Act1), the process of the image forming apparatus 100 proceeds to Act2 to Act4. In Act2 to Act4, the controller 22 classifies the jobs in the job queue 24 into job groups A, B, and C so that jobs having the same control temperature range are included in the same job group. The job groups A to C are groups that differ in the control temperature range. The controller 22 arranges the job groups A to C in the job queue 24 in the order in which a time to complete execution of all the job groups A to C is decreased. Here, the job group is assumed to include a case including only one job as well.

Specifically, in Act2 of FIG. 4, the controller 22 determines whether or not the temperature increase speed of the heat source 19 is larger than the temperature decrease speed of the heat source 19. The temperature increase speed is a speed at which the temperature of the heat source 19 is increased when it is necessary to increase the temperature of the heat source 19 toward the control temperature range according to the job. The temperature decrease speed is a speed at which the temperature of the heat source 19 is decreased when it is necessary to decrease the temperature of the heat source 19 toward the control temperature range according to the job. Thus, when the temperature increase speed is larger than the temperature decrease speed, it means that it is desirable to perform changing of the temperature of the heat source 19 for adjusting the temperature of the heat source 19 to the control temperature range for job execution by increasing the temperature. When the temperature increase speed is not larger than (is smaller than) the temperature decrease speed, it means that it is desirable to perform changing of the temperature of the heat source 19 for adjusting the temperature of the heat source 19 to the control temperature range for job execution by decreasing the temperature. The memory 222 stores data of the temperature increase speed according to the job and data of the temperature decrease speed according to the job in advance. The controller 22 determines whether or not the temperature increase speed of the heat source 19 is larger than the temperature decrease speed with reference to the data of the temperature increase speed and the data of the temperature decrease speed stored in the memory 222.

In Act2, when the controller 22 determines that the temperature increase speed of the heat source 19 is larger than the temperature decrease speed (YES in Act2), the process of the image forming apparatus 100 proceeds to Act3. In other words, when the controller 22 determines that it is desirable to change the temperature of the heat source 19 by increasing the temperature, the process of the image forming apparatus 100 proceeds to Act3. In Act3, the controller 22 performs the first job sorting illustrated in FIG. 5. Specifically, the controller 22 sorts the jobs in the job queue 24 in the ascending order of the control temperature ranges through the first job sorting. More specifically, the controller 22 classifies the jobs in the job queue 24 into the job groups A to C that differ in the control temperature range of the heat source 19. The controller 22 performs grouping so that the decoloring job 1 and the decoloring job 2 in which the control temperature range of the heat source 19 for job execution is "200° C. to 220° C." are included in the decoloring job group A with reference to the data (see FIG. 3) of the control temperature range of the heat source 19 stored in the memory 222. The controller 22 performs grouping so that the non-decolorable image forming job 1 and the non-decolorable image forming job 2 in which the control temperature range of the heat source 19 for job execution is "170° C. to 190° C." are included in the non-decolorable image forming job group B with reference to the data of the control temperature range of the memory 222. The controller 22 performs grouping so that the decolorable image forming job 1 and the decolorable image forming job 2 in which the control temperature range of the heat source 19 for job execution is "150° C. to 160° C." are included in the decolorable image forming job group C with reference to the data of the control temperature range of the memory 222. Further, the controller 22 arranges the groups A to C in the ascending order of the control temperature ranges of the heat source 19 with reference to the data (see FIG. 3) of the control temperature range of the heat source 19 stored in the memory 222. Specifically, as illustrated in FIG. 5 (after the sorting), the controller 22 arranges the job groups in the order of the decolorable image forming job group C, the non-decolorable image forming job group B, and the decoloring job group A from the head side in the job queue 24.

As described above, the controller 22 arranges the job groups A to C in the ascending order of the control temperature ranges of the heat source 19 from the head side in the job queue 24. Further, the controller 22 arranges the job that is early registered in the job queue 24 among the jobs in the same job groups A to C at the head side. In other words, the controller 22 arranges the job that is early received by the operation panel 24 among the jobs in the same job groups A to C at the head side. Specifically, as illustrated in FIG. 5, the controller 22 arranges the jobs of the decolorable image forming job group C in the order of the decolorable image forming job 1 and the decolorable image forming job 2 from the head side. The controller 22 arranges the jobs of the non-decolorable image forming job group B in the order of the non-decolorable image forming job 1 and the non-decolorable image forming job 2 from the head side. The controller 22 arranges the jobs of the decoloring job group A in the order of the decoloring job 1 and the decoloring job 2 from the head side. Through the process of Act3, the registration of the jobs in the job queue 24 is changed such that the decolorable image forming job 1, the decolorable image forming job 2, the non-decolorable image forming job 1, the non-decolorable image forming job 2, the decoloring job 1, and the decoloring job 2 are sorted in order from the head side as illustrated in FIG. 5 (after the sorting).

As described above, the image forming apparatus 100 arranges the jobs of the same control temperature range consecutively and thus can reduce occasions of changing (increasing or decreasing) the temperature of the heat source 19. Thus, the image forming apparatus 100 can reduce a time required to complete the jobs. Meanwhile, when job execution transitions between the two of the job groups A to C, it is necessary to change the temperature of the heat source 19. On the other hand, in Act2, the controller 22 determines that it is desirable to change the temperature of the heat source 19 by increasing the temperature, and sorts the jobs in the job queue 24 so that the temperature of the heat source 19 is increased. Thus, the image forming apparatus 100 can rapidly change the temperature of the heat source 19 and further reduce a time to complete the jobs.

Figure 6:
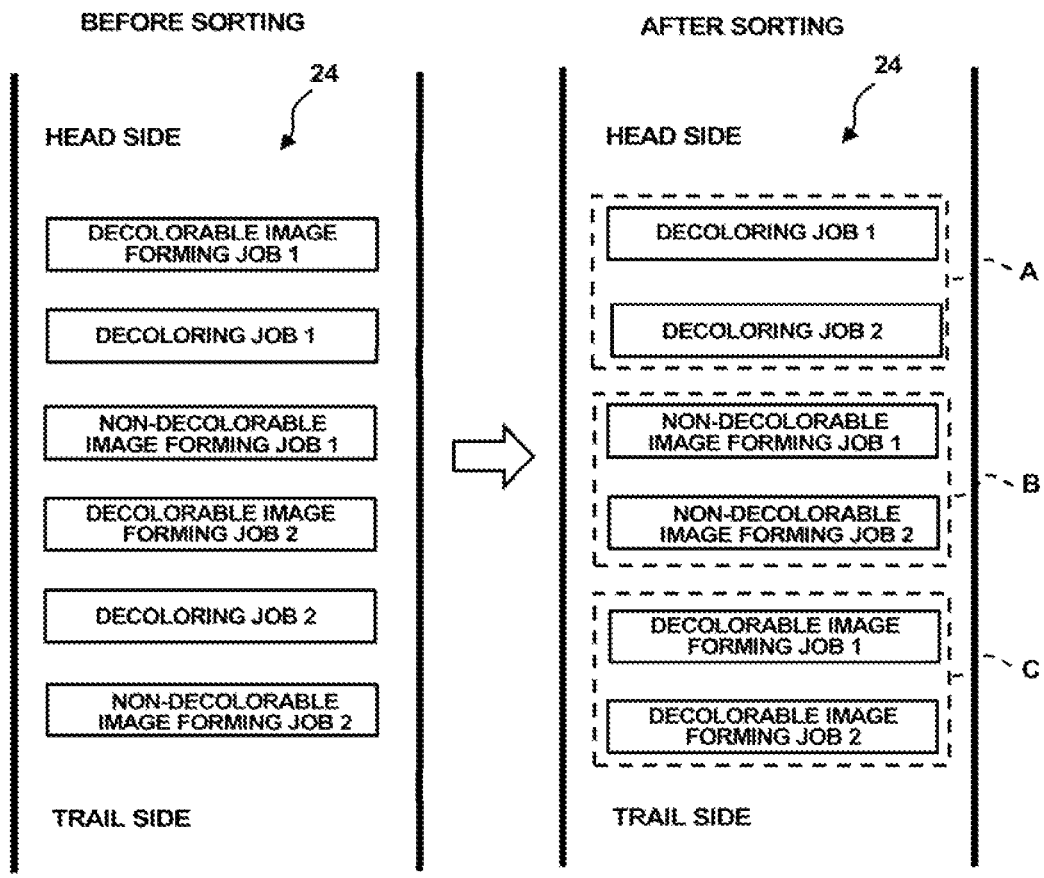
FIG. 6 is a diagram illustrating job sorting in a job queue when an image forming apparatus according to an embodiment decreases a temperature of a heat source.

FIG. 6 is a diagram illustrating job sorting (hereinafter, referred to as "second job sorting") in the job queue 24 when the image forming apparatus 100 decreases the temperature of the heat source for job execution. A pre-job sorting state is the same as in FIG. 5. Through the second job sorting which will be described below, the jobs in the job queue 24 change the registration from the pre-job sorting state to the post-job sorting state as illustrated in FIG. 6. Specifically, in Act2, when the controller 22 determines that the temperature increase speed of the heat source 19 is smaller than the temperature decrease speed (NO in Act2), the process of the image forming apparatus 100 proceeds to Act4. In other words, when the controller 22 determines that it is desirable to change the temperature of the heat source 19 by decreasing the temperature, the process of the image forming apparatus 100 proceeds to Act4. In Act4, the controller 22 performs the second job sorting. Specifically, the controller 22 sorts the jobs in the job queue 24 in the descending order of the control temperature ranges through the second job sorting. More specifically, the controller 22 first groups the jobs in the job queue 24 into the job groups A to C that differ in the control temperature range of the heat source 19, similarly to the process of Act4. The controller 22 performs grouping so that the decoloring job 1 and the decoloring job 2 in which the control temperature range of the heat source 19 for job execution is "200° C. to 220° C." are included in the decoloring job group A with reference to the data (see FIG. 3) of the control temperature range of the heat source 19 stored in the memory 222. The controller 22 performs grouping so that the non-decolorable image forming job 1 and the non-decolorable image forming job 2 in which the control temperature range of the heat source 19 for job execution is "170° C. to 190° C." are included in the non-decolorable image forming job group B with reference to the data of the control temperature range of the memory 222. The controller 22 performs grouping so that the decolorable image forming job 1 and the decolorable image forming job 2 in which the control temperature range of the heat source 19 for job execution is "150° C. to 160° C." are included in the decolorable image forming job group C with reference to the data of the control temperature range of the memory 222. Further, the controller 22 sorts the groups A to C in the descending order of the control temperature ranges of the heat source 19 with reference to the data (see FIG. 3) of the control temperature range of the heat source 19 stored in the memory 222. Specifically, as illustrated in FIG. 6 (after sorting), the controller 22 sorts the job groups in the order of the decoloring job group A, the non-decolorable image forming job group B, and the decolorable image forming job group C from the head side in the job queue 24. Further, the controller 22 arranges the job that is early registered in the job queue 24 among the jobs in the same job groups A to C at the head side. In other words, the controller 22 arranges the job that is early received by the operation panel 24 among the jobs in the same job groups A to C at the head side. Specifically, as illustrated in FIG. 6, the controller 22 arranges the jobs in the order of the decoloring job 1 and the decoloring job 2 from the head side in the decoloring job group A. The controller 22 arranges the jobs in the order of the non-decolorable image forming job 1 and the non-decolorable image forming job 2 from the head side in the non-decolorable image forming job group B. The controller 22 arranges the jobs in the order of the decolorable image forming job 1 and the decolorable image forming job 2 from the head side in the decolorable image forming job group C. Through the process of Act4, as illustrated in FIG. 6 (after sorting), the registration of the jobs in the job queue 24 is changed such that the decoloring job 1, the decoloring job 2, the non-decolorable image forming job 1, the non-decolorable image forming job 2, the decolorable image forming job 1, the decolorable image forming job 2 are sorted in order from the head side.

As described above, in Act2, the controller 22 determines that it is desirable to change the temperature of the heat source 19 by decreasing the temperature, and sorts the jobs in the job queue 24 so that the temperature of the heat source 19 is decreased. Thus, the image forming apparatus 100 can rapidly change the temperature of the heat source 19 and reduce a time to complete the jobs.

Meanwhile, in the process illustrated in FIG. 4, when the process of Act3 or Act4 ends, the process of the image forming apparatus 100 proceeds to Act5. In Act5, the controller 22 determines whether or not the temperature of the heat source 19 is within the control temperature range (the target temperature) according to the job in the head of the job queue 24 based on the temperature detection result of the temperature sensor 193. When the controller 22 determines that the temperature of the heat source 19 is not within the control temperature range according to the job in the head (NO in Act5), the process of the image forming apparatus 100 proceeds to Act6. In Act6, the controller 22 increases or decreases the temperature of the heat source 19, for example, during a certain period of time so that the temperature of the heat source 19 falls within the control temperature range according to the job in the head of the job queue 24. After the certain period of time elapses, the process of the image forming apparatus 100 returns to Act5. The controller 22 repeatedly performs the process of Act5 and Act6 until the temperature of the heat source 19 falls within the control temperature range according to the job in the head of the job queue 24. Further, when the controller 22 determines that there are only the jobs that are equal in the control temperature range in the job queue 24 in Act1 (NO in Act1), the process of the image forming apparatus 100 proceeds to Act5.

When the controller 22 determines that the temperature of the heat source 19 is within the control temperature range according to the job in the head of the job queue 24 in Act5 (YES in Act5), the process of the image forming apparatus 100 proceeds to Act7. In Act7, the controller 22 executes the job in the head of the job queue 24. After the job is executed, the process of the image forming apparatus 100 proceeds to Act8. In Act8, the controller 22 deletes the executed job (the job in the head) from the job queue 24. After the job is deleted, the process of the image forming apparatus 100 proceeds to Act9.

In Act9, the controller 22 determines whether or not there is a job registered in the job queue 24. When the controller 22 determines that there is a job registered in the job queue 24 (NO in Act9), the process of the image forming apparatus 100 returns to Act5. The controller 22 repeatedly performs the processes of Act5 to Act9 until there is no job registered in the job queue 24. When the controller 22 determines that there is no job registered in the job queue 24 in Act9 (YES in Act9), the job execution process of the image forming apparatus 100 ends.

Figure 7:
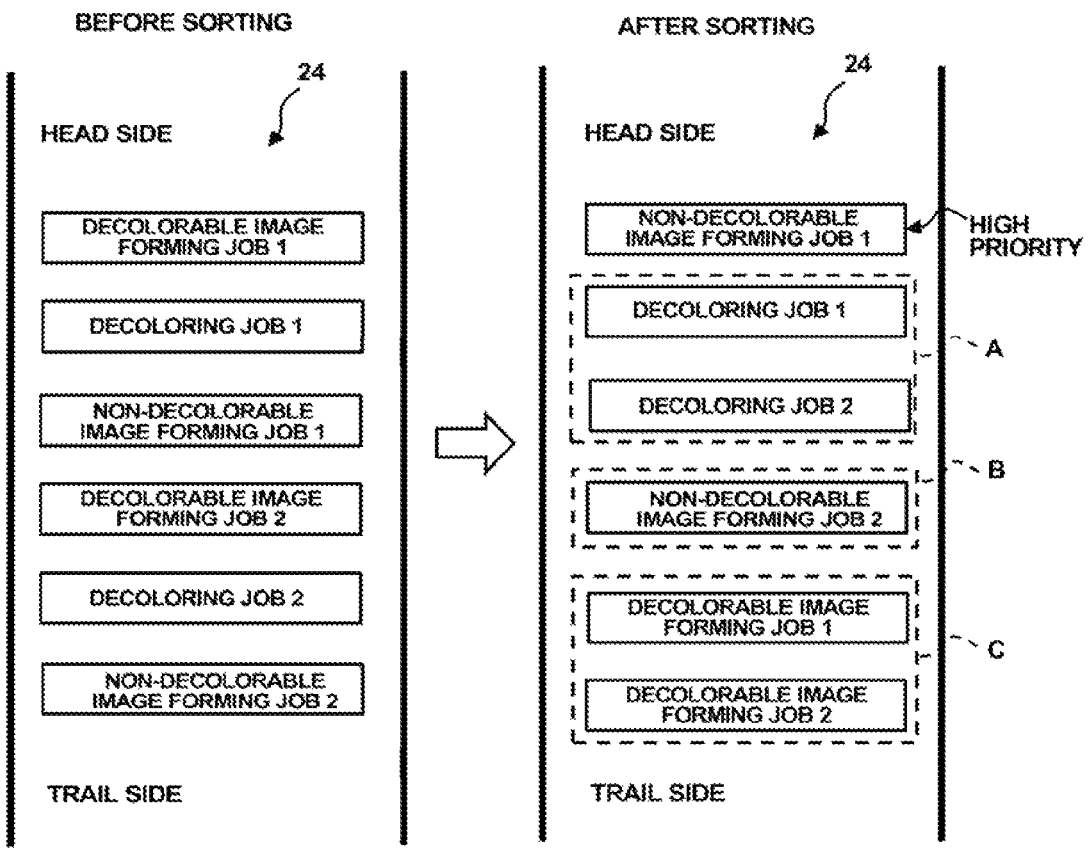
FIG. 7 is a diagram illustrating job sorting in a job queue when an image forming apparatus according to an embodiment sets a priority to a job.

Next, job sorting (hereinafter, referred to as "third job sorting") when a priority is set to the jobs in the job queue 24 will be described with reference to FIG. 7. FIG. 7 is a diagram illustrating job sorting in the job queue 24 when the image forming apparatus 100 sets a priority to a job. The controller 22 can set a priority to each job. For example, the controller 22 sets a higher priority to the non-decolorable image forming job 1 than the other jobs. For example, in the job sorting process of Act3 or Act4, the controller 22 determines whether or not a job (the non-decolorable image forming job 1) having a high priority has been registered in the job queue 24. When the non-decolorable image forming job 1 has been registered in the job queue 24, the controller 22 arranges the non-decolorable image forming job 1 having the high priority at the head side in the job queue 24 through the third job sorting illustrated in FIG. 7. Then, the controller 22 arranges the job groups A to C after the non-decolorable image forming job 1.

Figure 8:
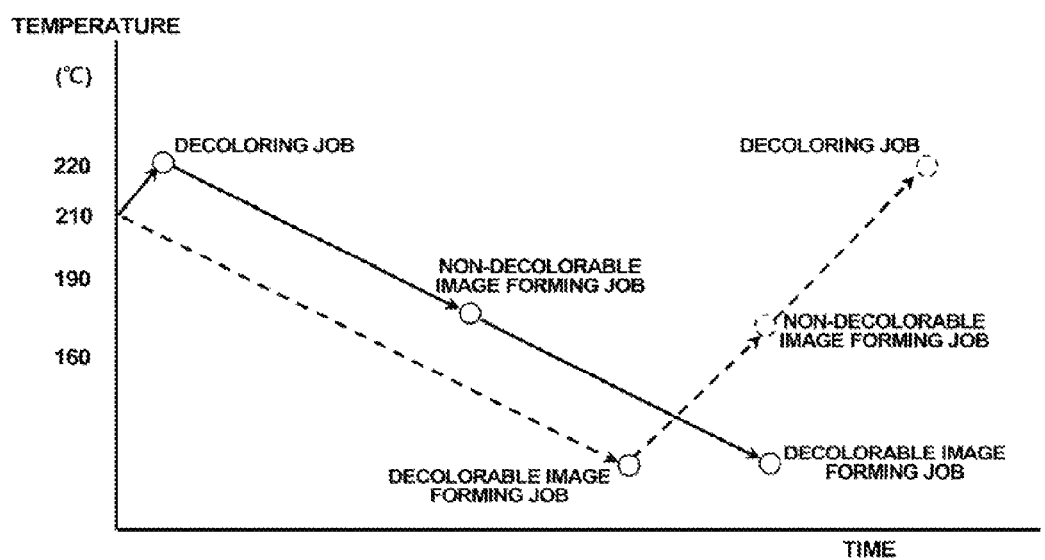
FIG. 8 is a diagram illustrating a relation between a transition and an elapsed time of a control temperature of a heat source when an image forming apparatus according to an embodiment performs job sorting in a job queue in view of a current temperature of the heat source.

Next, job sorting (hereinafter, referred to as "fourth job sorting") in which the current temperature of the heat source 19 is considered will be described with reference to FIG. 8. FIG. 8 is a diagram illustrating a relation between a transition and an elapsed time of the control temperature of the heat source 19 when the image forming apparatus 100 performs job sorting in view of the current temperature of the heat source 19. In FIG. 8, a vertical axis denotes a control temperature, and a horizontal axis denotes an elapsed time. In the following description, in the pre-job sorting state, the job queue 24 registers the non-decolorable image forming job, the decolorable image forming job, and the decoloring job in the described order. Further, when the non-decolorable image forming job is executed, the controller 22 adjusts the temperature of the heat source 19 to 190° C. in the control temperature range (170° C. to 190° C.). When the decolorable image forming job is executed, the controller 22 adjusts the temperature of the heat source 19 to 160° C. in the control temperature range (150° C. to 160° C.). Further, when the decoloring job is executed, the controller 22 adjusts the temperature of the heat source 19 to 220° C. in the control temperature range (200° C. to 220° C.) In the case of the process illustrated in FIG. 4, when the controller 22 determines that the temperature increase speed of the heat source 19 is larger than the temperature decrease speed (YES in Act2), the controller 22 performs the first job sorting illustrated in FIG. 5, and registers the jobs in the job queue 24 again.

As described above, in the case of the first job sorting, the controller 22 sorts the jobs in the job queue 24 in the ascending order of the control temperatures (the order of the decolorable image forming job, the non-decolorable image forming job, and the decoloring job). Thus, the controller 22 changes the temperature of the heat source 19 in order to execute the jobs according to the sorted order as indicated by a dotted line in FIG. 8.

On the other hand, in the case of the fourth job sorting, the controller 22 sorts the jobs (the job groups) so that a time required to complete execution of all the jobs (all the job groups) becomes shortest in view of the current temperature of the heat source 19. Specifically, the controller 22 determines whether or not the current temperature of the heat source 19 is a temperature close to the control temperature of the decoloring job (the job having the highest control temperature) based on the temperature detection result of the temperature sensor 193. For example, when the image forming apparatus 100 in a state immediately after the decoloring job is performed, the controller 22 determines that the current temperature of the heat source 19 is a temperature (for example, 210° C.) close to the control temperature (220° C.) of the decoloring job. When the current temperature of the heat source 19 is 210° C. close to the control temperature of the decoloring job, the controller 22 sorts the jobs in the job queue 24 in the descending order of the control temperature (the order of the decoloring job, the non-decolorable image forming job, and the decolorable image forming job) through the fourth sorting.

Thus, the controller 22 changes the temperature of the heat source 19 in order to execute the jobs according to the sorted order as indicated by a solid line in FIG. 8. In other words, in the case in which the fourth job sorting is applied, the controller 22 performs changing of the temperature of the heat source 19 between the respective jobs by decreasing the temperature although the temperature increase speed of the heat source 19 is larger than the temperature decrease speed. For this reason, it takes some time to perform changing of the temperature of the heat source 19 between the respective jobs. However, compared to when the temperature of the heat source 19 is changed according to the first job sorting of FIG. 5 (the dotted line in FIG. 8), when the temperature of the heat source 19 is changed according to the fourth job sorting (the solid line in FIG. 8), it is possible to remarkably reduce a time taken until a first job is executed. Thus, when the temperature of the heat source 19 is changed according to the fourth job sorting, it is possible to reduce a total required time taken until the jobs are completed although it takes some time to perform changing of the temperature of the heat source 19 between the respective jobs.

In the above embodiment, the controller 22 may not change the temperature of the heat source 19 using a control temperature range having a width as a target, and may change the temperature of the heat source 19 using one control temperature as a target as described above with reference to FIG. 8. The image forming apparatus may include the image forming unit (the first image forming unit 17 in the above embodiment) using the decolorable toner as the image forming unit and may not include the image forming unit (the second image forming unit 18 in the above embodiment) using the non-decolorable toner. The number of jobs included in the job group may be one.

The order of the processes in the above embodiment may be different from the above-described order.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an image forming unit that forms an image on a sheet;
a heat source that heats the sheet at a control temperature according to a job type;
a storage unit including a job queue that registers jobs in a received order; and
a controller that, when a plurality of jobs that differ in the control temperature are registered in the job queue:
groups the lobs registered in the job queue into job groups that differ in the control temperature,
determines whether a speed of temperature increase of the heat source is larger than a speed of temperature decrease of the heat source with respect to the corresponding control temperatures of the job groups,
changes an execution order of the job groups in the job queue so that a required time for execution of all the job groups is shorter than any other execution order based on the determination of whether the speed of temperature increase is larger than a speed of temperature decrease, and
executes the jobs registered in the job queue according to the changed order.

2. The image forming apparatus according to claim 1, wherein when the speed of the temperature increase of the heat source is determined to be larger than the speed of the temperature decrease of the heat source, the controller arranges the job groups in the job queue so that the job groups are executed in an ascending order of the corresponding control temperatures.

3. The image forming apparatus according to claim 1, wherein when the speed of the temperature increase of the heat source is determined to be smaller than the speed of the temperature decrease of the heat source, the controller arranges the job groups in the job queue so that the job groups are executed in a descending order of the corresponding control temperatures.

4. The image forming apparatus according to claim 1, further comprising,
a temperature sensor that detects a temperature of the heat source,
wherein the controller arranges the job groups based on a current temperature of the heat source detected by the temperature sensor.

5. The image forming apparatus according to claim 4, wherein when the speed of the temperature increase of the heat source is determined to be larger than the speed of the temperature decrease of the heat source, and the current temperature of the heat source is close to a highest control temperature among the corresponding control temperatures of the jobs registered in the job queue, the controller arranges the job groups in the job queue so that the job groups are executed in a descending order of the control temperatures.

6. The image forming apparatus according to claim 1, wherein the image forming unit includes a first image forming unit that forms an image on a sheet using a decolorable color material for a decolorable image forming job and a second image forming unit that forms an image on a sheet using a non-decolorable color material for a non-decolorable image forming job.

7. The image forming apparatus according to claim 1, wherein when a job having a high priority is registered in the job queue, the controller arranges the job having the high priority in the job queue to be executed before any jobs not having the high priority.

8. The image forming apparatus according to claim 1, wherein the controller arranges the jobs within the same job group to be executed in a received order.

* * * * *